3,194,321
COMBINATION HITCH, DEPTH CONTROL AND SPRING RELEASE FOR ROD WEEDERS
Floyd Arthur Sande, Box 5, Lomond, Alberta, Canada
Filed Mar. 23, 1964, Ser. No. 353,748
3 Claims. (Cl. 172—44)

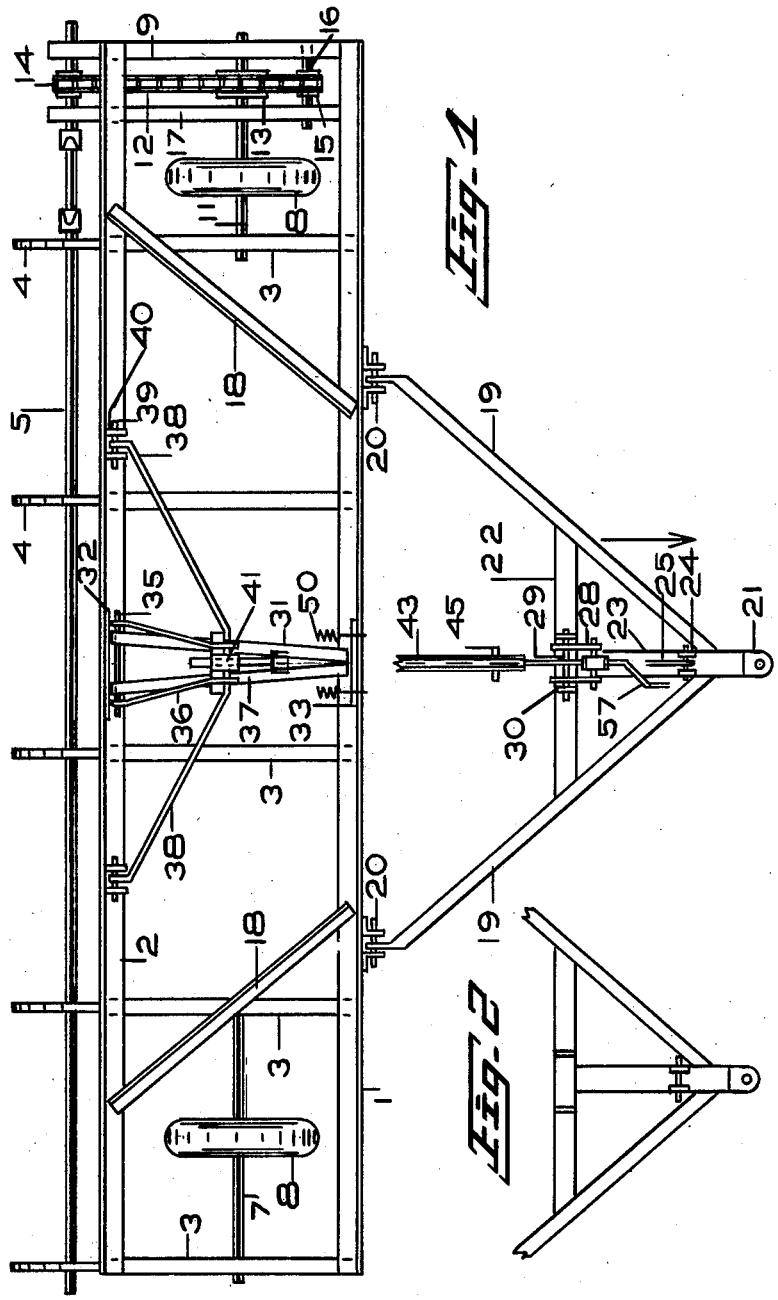

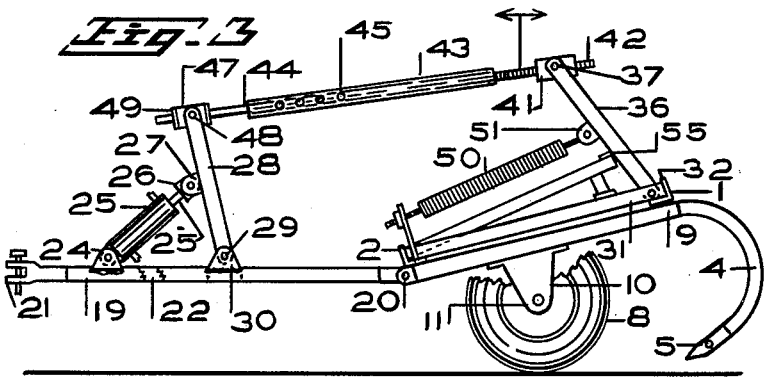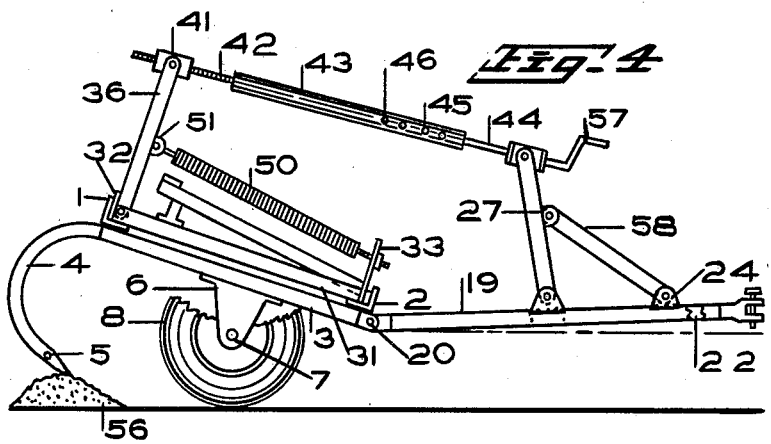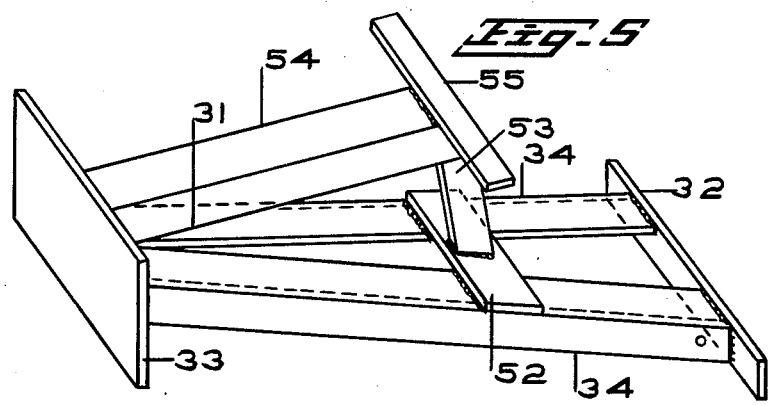

This invention relates to rotary rod weeders, having particular reference to a new and improved mounting for weeder rod carrying shanks, and including improved means for application of the draft to the weeder for maintaining uniform cultivating depth.

In the art to which the invention relates, in rod weeders of a character such as herein disclosed a castor wheel is more usually employed rearwardly supporting the weeder rod and shank assembly, and the draft pull in such weeders tends to draw the weeder upwards out of contact with the ground. In such machines the line of draft between the tractor hitch and the weeder rod is only slightly below the line of pull from the tractor hitch to the rod weeder machine. The weight of the weeder frame and castor wheel is all that keeps the weeder rod at a proper depth, and the castor wheel keeps the rod from going too deep in loose soil. When an obstruction is encountered, such as a solid stone imbedded in the soil and to clear which the weeder rod must rise, this upward movement of the rod is limited to the line of pull of the tractor to the weeder connection, above which level the whole rod weeder must rise in clearing the obstruction.

The present machine is designed to eliminate these difficulties by raising the line of pull of the tractor to the rod weeder to substantially a horizontal level, and by doing away with the castor wheel as well. There is also included improved spring means holding the rod by spring pressure in a relation to the ground at an even working depth of cultivation, and by permitting the rod to rise in clearing an obstruction, with the rod weeder tilting on its supporting ground wheels. Both the castor wheels and the depth control levers commonly in use are eliminated.

Other features and advantages of the invention will become apparent by reference to the accompanying description taken in conjunction with the drawings.

In the drawings, wherein is illustrated a preferred embodiment of the invention, FIG. 1 is a top plan view of a rod weeder embodying my improvements, shown with some parts omitted for convenience of illustration, and with parts broken away.

FIG. 2 is a top plan view showing a fragment of the draft connection and tractor hitch.

FIG. 3 is a side view of the machine, taken from the left side, showing the weeder rod raised by the hydraulic element, and shown as broken away in part.

FIG. 4 is a side view of the machine, taken from the right side, showing the weeder frame tilted, as when the rod is clearing an obstruction, and shown broken away in part.

FIG. 5 is a side perspective view of the frame for mounting the rod cushioning springs, and including the stop limiting elevation of the weeder frame by the hydraulic element.

Having reference to the drawings, front and rear frame bars 1 and 2, preferably of angle iron, extend transversely of the machine, and to the upper sides of these, at intervals, are attached elongated body portions 3 of shanks 4 that carry a weeder rod 5. Two of the end shank body portions 3 (FIG. 1) mount brackets, as at 6 in FIGURE 4, in which is rotatable an axle shaft 7 for a ground wheel 8. At the other end of the machine the body portion 3 of the end shank and a cross frame bar 9 attached to the under sides of the frame bars 1 and 2 mount bearing brackets, as at 10 in FIGURE 3, in which is rotatable an axle shaft 11 for a ground wheel 8 that is fixed thereto.

The axle shaft 11 is connected in driving relation to the rotary rod 5 by a chain 12 (FIG. 1) trained over a sprocket wheel 13 on the axle shaft and a sprocket 14 on the weeder rod, and further over an idler sprocket 15 on a shaft 16 carried by the cross bar 9 and a cross bar 17, the bar 17 attaching to the under sides of the frame bars 1 and 2, spaced from the bar 9 for mounting the drive chain therebetween.

The front and rear frame bars 1 and 2 are braced by bars 18.

A draft section for the machine comprises integrally connected bars 19 forming a unit pivotally connected at 20 to the front frame bar 1 and forwardly terminating in an integral clevis portion 21.

To the forward ends of the draft unit side bars, and to a cross bar 22, is fixed, as by welding, a bar 23 on which are lugs 24 to which is anchored a hydraulic element 25 that rearwardly has its piston rod 25′ intermediately connected by a pin 26 (FIG. 3) to lugs 27 on uprights 28 that are pivoted on a pin 29 (FIGS. 3 and 4) carried by lugs 30 on the bar 22.

Mounted on the frame bars 1 and 2 is a frame 31, separately illustrated in FIGURE 5, that includes end plates 32 and 33 connected by diverging angle iron bars 34.

In the one end of the frame 31 is mounted a pin 35 (FIG. 1) to which pivotally attach upstanding arms 36 carrying pins 37 engaged by brace bars 38 that pivot on pins 39 in lugs 40 on the frame bar 2. On the pins 37 is pivoted a coupling 41 (FIGS. 3 and 4) in which is threaded a rod 42 that is fixed in a tube 43. The other end of the tube 43 has a rod 44 slidable therein to be fixed at selected positions of adjustment by a pin 45 (FIG. 1) engaged in one or other of a series of openings 46 (FIGS. 3 and 4) through the tube and a complementary opening in the rod.

The rod 44 is engaged in a coupling 47 pivoted on a pin 48 carried by the uprights 28. Collars 49 are fixed on the rod 44, one on each side of the coupling 47.

To the plate 33 of the frame 31 are attached springs 50 that rearwardly connect intermediately to lugs 51 on the upstanding arms 36 (FIG. 3).

On the frame 31 (FIG. 5) is a cross bar 52 with upstanding arms 53 supporting one end of a bar 54, the other end of which would be fixed to the end plate, as by welding. On the bar 54 is a cross bar 55 forming a stop against which the upstanding arms 36 bear (FIG. 3) to limit the forward movement of these arms.

In the use of the device, to raise or lower the shanks 4 and weeder rod 5 out of working relation with the ground or into the ground the hydraulic element 25 is used. This pulls forward on the uprights 28 (FIG. 3), which, by their connection through the rods 44 and 42 and the tube 43 pull forward on the arms 36, tilting the shank and rod carrying unit on the wheel axle shafts 7 and 11, until the arms 36 come in contact with the stop plate 55.

When an obstruction is encountered by the weeder rod or shanks, such as the stone 56 in FIGURE 4, the shank and rod carrying unit tilts on the axle shafts 7 and 11, pivoting on the connections at 20 with the draft bars 19. In this movement the uprights 28 are held by the connection of the hydraulic element 25 through its piston rod 25′, and the piston rod through the rods 42 and 44 and the tube 43 pushes upward and rearward on the arms 36, expanding the springs 50 which cushion the upward movement of the shanks and weeder rod.

The springs 50 also serve to hold the shanks and the weeder rod in working relation with the ground, opposing any upward movement thereof and obtaining even depth of cultivation.

A hand crank 57, attached to the rod 42, could be used to turn the rod and by which the weeder rod assembly could be raised or lowered, replacing the hydraulic element 25, in which event a metal brace 58, FIGURE 4, would be connected to the uprights 28 in place of the hydraulic element and to the lugs 23.

What I claim is:

1. A rod weeder having a draft section and a shank carrying frame pivotally attached on its forward side to the draft section to pivot vertically relative thereto, the draft section having uprights mounted thereon and the shank carrying frame having upstanding arms mounted thereon, and including means adjustably connecting and holding said arms and uprights in fixed relation to each other, said shank carrying frame mounted on supporting wheels free to pivot forward and backward thereon; in which said uprights and arms are pivotally mounted respectively on the draft section and shank carrying frame to move forward and backward thereon, means anchored to the draft section and connected to said uprights by which the uprights may be held against pivotal movement, expansion springs attached to the upstanding arms on the shank carrying frame, and means anchoring said springs to said frame tensionable by a backward movement of said arms.

2. A rod weeder as set out in claim 1 and in which the means anchored to the draft section and connected to the uprights on the draft section comprise a hydraulic element by which the uprights may be moved forward and backward, and including a stop frame on the shank carrying frame limiting forward pivotal movement of the upstanding arms.

3. In a rod weeder having a draft section and a wheel supported shank carrying frame forwardly pivotally attached to the draft section for vertical pivotal movement relative thereto, uprights pivotally mounted on the draft section, upstanding arms pivotally mounted on the shank carrying frame, said uprights and arms being pivotally movable forward and backward, means connecting the arms and uprights to be movable as a unit, a hydraulic element anchored on the draft section and connected to said uprights for imparting forward and backward pivotal movement to said unit, a stop frame mounted on the shank carrying frame, said stop frame having a transverse plate against which the upstanding arms bear limiting forward movement of said arms, and expansion springs anchored to the stop frame and connected to the upstanding arms tensionable by a backward pivotal movement of said arms.

References Cited by the Examiner

UNITED STATES PATENTS

| | | | |
|---|---|---|---|
| 1,854,903 | 4/32 | Robinson | 172—44 |
| 2,176,541 | 10/39 | Morris | 172—44 |
| 2,309,203 | 1/43 | Morkoski | 172—323 X |
| 2,325,882 | 8/43 | Scarlett | 172—44 |
| 2,540,265 | 2/51 | James | 172—44 X |
| 3,135,337 | 6/64 | Morris | 172—44 |

ABRAHAM G. STONE, *Primary Examiner.*